United States Patent [19]

Simmons et al.

[11] 4,399,534
[45] * Aug. 16, 1983

[54] DUAL RAIL TIME AND CONTROL UNIT FOR A DUPLEX T-S-T-DIGITAL SWITCHING SYSTEM

[75] Inventors: Nathaniel Simmons; Stig Magnusson, both of Phoenix; Sergio E. Puccini, Scottsdale, all of Ariz.; Donald W. McLaughlin, Naperville; David J. Stelte, Lombard, both of Ill.

[73] Assignee: GTE Automatic Electric Labs Inc., Northlake, Ill.

[ * ] Notice: The portion of the term of this patent subsequent to Jul. 5, 2000, has been disclaimed.

[21] Appl. No.: 219,549

[22] Filed: Dec. 23, 1980

[51] Int. Cl.³ .............................................. H04J 3/00
[52] U.S. Cl. ................................. 370/63; 179/1 SW; 179/18 J; 370/58
[58] Field of Search .................. 370/63, 58; 179/18 J, 179/18 G, 18 ES, 1 SW

[56] References Cited

U.S. PATENT DOCUMENTS

| | | | |
|---|---|---|---|
| 3,956,593 | 5/1976 | Collins et al. | 370/63 |
| 3,991,276 | 11/1976 | Regnier et al. | 370/63 |
| 4,005,272 | 1/1977 | Collins et al. | 370/63 |
| 4,064,370 | 12/1977 | Coonce et al. | 370/58 |
| 4,142,068 | 2/1979 | Charronsel et al. | 370/63 |
| 4,160,127 | 7/1979 | Slana et al. | 370/63 |
| 4,322,843 | 3/1982 | Beuscher et al. | 370/63 |

OTHER PUBLICATIONS

Moridera et al., "Fetex Digital Switching System for Central Office," Int. Conf. on Comm., Toronto, Canada, Jun. 4-7, 1978.

Primary Examiner—Glen R. Swann, III
Attorney, Agent, or Firm—Frank J. Bogacz; Robert J. Black

[57] ABSTRACT

A duplex time-space-time switching network is shown in which there is a crossover of voice information from one rail to another rail in a large digital switching system. The time and control unit is divided into two rails both incoming and outgoing. Each rail multiplexes two 193 channel streams into one 386 channel stream of information. These two rails crossover in the terminating time switching stage but remain segregated throughout the space switching stage and the terminating time switching stage.

9 Claims, 5 Drawing Figures

DUAL RAIL TIME AND CONTROL UNIT FOR A DUPLEX T-S-T DIGITAL SWITCHING SYSTEM

CROSS-REFERENCE TO RELATED APPLICATIONS

The present application is related to co-pending U.S. patent application Ser. Nos.: 219,547; 219,548; 219,550; 219,464 and 219,546, all assigned to the same assignee.

BACKGROUND OF THE INVENTION

The present invention pertains to digital switching systems and more particularly to a large capacity fault tolerant time switching stage of a digital switching system.

The technology of telephone switching centers has proceeded from mechanical to electromechanical to solid state technologies. The network portion of the switching centers has kept the pace with this change of technologies. The network of large switching systems has gone from a mechanical network to an analog electromechanical network to the present modern day solid state digital networks.

Due to the public policy of requiring telephone switching centers to operate 24 hours a day continuously without disruption of service, highly reliable switching systems are required. This requirement causes added complexity for telephone switching centers which are CPU controlled solid state digital networks.

In addition, an increasing number of customers has provided for an increased amount of central switching system capability. Digital switching techniques were initially introduced via PABX switching equipment. Following this introduction, digital techniques were employed in larger PABX's and finally in central office switch equipment.

As the demand for digital switching equipment grows, large central office switching systems are required. Further, it is required that these switching systems operate efficiently in terms of power consumed and heat dissipated and with a minimum of components. As these switching systems grow, larger channel capacities are required.

One scheme of increasing the network capacity of a digital switching system is to increase the size of the time and space switching sections of a time-space switching network. However, doubling the number of time stages may increase the size of the space stage by as much as a factor of two squared or 4 times. Such a configuration means greatly increasing the number of physical components of space switching equipment.

Such a solution is taught by U.S. Pat. No. 3,991,276, issued on Nov. 9, 1976, to A. Regnier et al. This system teaches a time-space-time division switching network employing a multistage space division switch. Another time-space-time switching network is taught in U.S. Pat. No. 4,005,272, issued on Jan. 25, 1977, to A. A. Collins et al. When this system establishes a communication path in one direction, it automatically establishes a path in the opposite direction in an adjacent time slot. However, such folded network systems provide a higher percentage of blocking which greatly lessens the call handling capacity of the system.

Another folded network time division switching system is taught by U.S. Pat. No. 4,064,370, issued on Dec. 20, 1977, to H. E. Coonce et al. The space division portion of the switching network is physically large resulting in delays of digital data words transmitted through the system. In addition, the problems of a folded network as mentioned in the Collins reference above are present in the Coonce system also.

In addition, a non-folded T-S-T modular network is taught by U.S. Pat. No. 3,956,593, issued to A. A. Collins et al, on May 11, 1976.

Accordingly, it is an object of the present invention to provide a large duplex time-space-time network for a digital switching system which is low in the percentage of blocking and providing for an efficient space switching stage while handling a large number of channels.

It is another important objective of the present invention to provide for a highly reliable time-space-time network configuration in order to prevent telephone traffic disruption due to a network equipment failure.

It is a further object of the present invention to provide for a low cost of telephone service provided to each customer.

It is a further object of the present invention to provide a time switching network for a large digital switching system having the capability to increase modularly and provide new telephone switching services to the telephone customers.

SUMMARY OF THE INVENTION

The present invention comprises a time stage in a non-folded duplex time-space-time digital switching system. Telephone subscribers are connected to analog facility interface units. An analog facility interface unit produces pulse code modulated (PCM) samples for transmission to the time-space-time network. The time stages of the network are termed time and control units. The number of time and control units in the system is modularly expandable from 1 to 64. Each time and control unit has an originating time stage and a terminating time stage. These time stages are connected between a respective analog facility interface unit and the space switching stage.

Each analog facility interface unit is also connected to another time and control unit (back up) which operates in parallel with the primary time and control unit to provide two parallel switching paths through the network for protection from network faults. The designation of primary and back up units is arbitrary. An initial status determination of back up and primary is made and subsequently this status may change from time to time according to the system's condition and certain parameters. It is required that there be as many back up time and control units as there are primary time and control units. Each telephone call is switched through two separate and independant paths through the network. A decision is made in the analog facility interface unit, which is connected to the terminating time stage, which talking path is to be transmitted to the subscriber. If a fault is present in one path, the identical voice samples in the back up path are transmitted to the subscriber.

Timing signals are provided to the primary and back up unit of each switching stage in order to synchronize their operation from a common source.

Each of the time stages are further connected via a microprocessor interface to a peripheral processor. The peripheral processor comprises a microprocessor CPU. The peripheral processor controls the switching of the calls through the time switching network. Each time stage consists of an information memory interconnected to a control memory. The peripheral processor associated with the particular time and control unit is connected to the control memory of both the originating and terminating time stages. Each information memory is connected to the space switching stage. The control memory contains information for determining the switching of the call. The information memory contains a PCM sample representing the amplitude of the voice signal of the telephone call.

Two rails, each rail consisting of 2 PCM channel streams from two facility interface units, are connected to each originating time stage. The two PCM stream comprising each rail are multiplexed into a memory unit corresponding to the particular rail in the originating time stage. In the terminating time stage, each PCM stream is multiplexed into a memory unit corresponding to the opposite rail as well as the corresponding rail.

PCM voice samples may be switched through the terminating time stage of the network on either rail A or B. Rail A and rail B each have duplicated separate switching paths through the originating time stage and the space switching stage of the two independant networks.

The information memory of the terminating time stage contains 4 information memory units. After the voice information is switched through the originating time stage and space switching stage, each PCM sample of voice information is simultaneously written into a memory associated with its originating switching rail and also the opposite rail. That is, rail A information is written into rail A and rail B memory units simultaneously in the terminating time stage; and rail B information is written into rail B and rail A memory units simultaneously.

If PCM voice samples are switched from rail A to rail B in the terminating time stage of the primary switching path, these signals are similarly switched from rail A to rail B in the back up network since the networks are operated synchronously. If in the terminating time stage the voice samples are switched from rail B to rail A in the primary switching network path, the operation of the back up network is analogous to that described above.

As a result, telephone calls originating on rail A, which would otherwise be blocked on the rail A path, are able to be switched through the terminating time stage of the network on rail B path with the back up network information available in case of a switching fault, and vice versa.

DESCRIPTION OF THE PREFERRED EMBODIMENT

Figure 1:
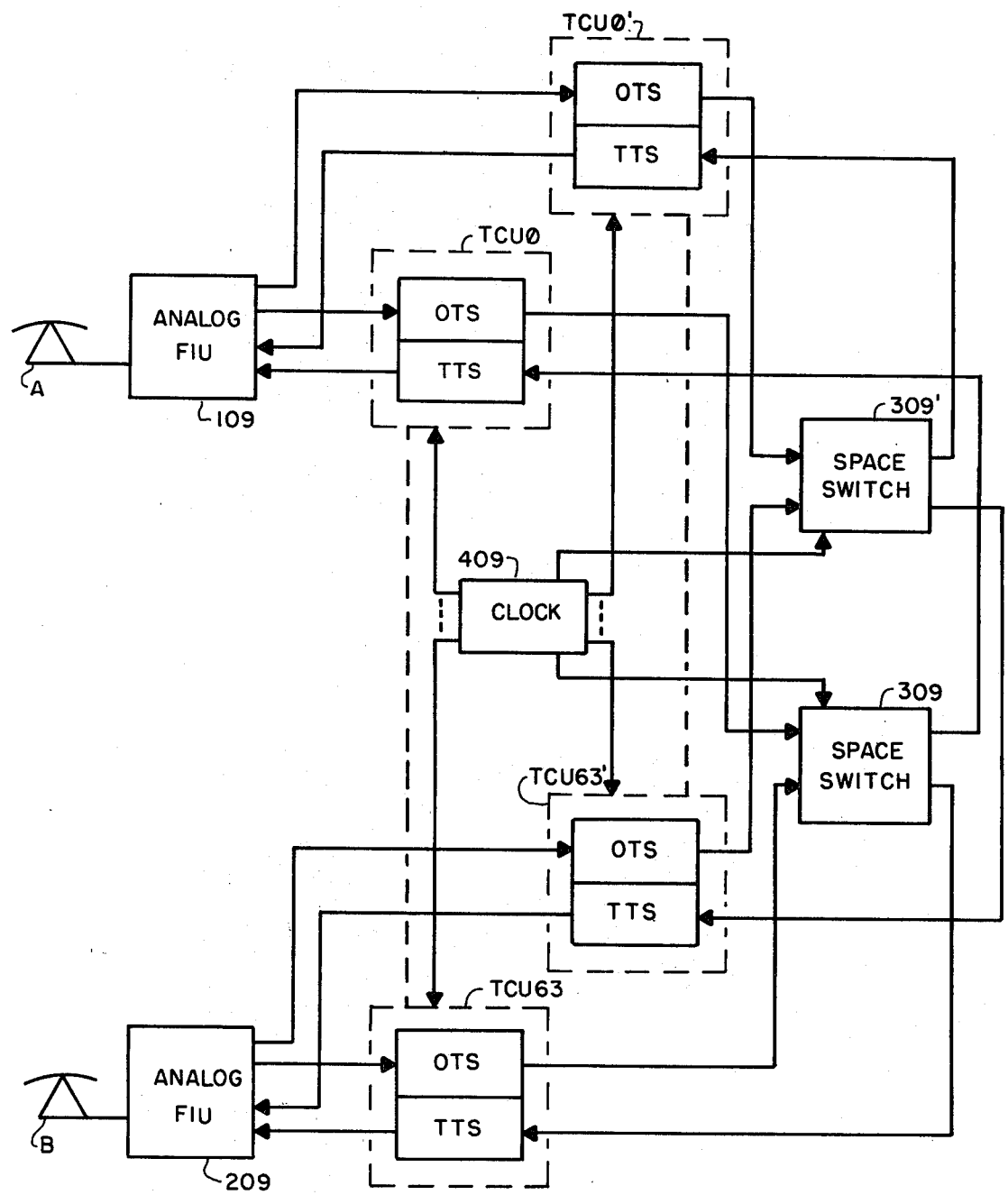
FIG. 1 is a block diagram of the duplex network structure of the present invention.

FIG. 1 is a block diagram showing the duplex network structure of the time-space-time network of the present invention. Telephone subscriber A is connected to analog facility interface unit (FIU) 109. Analog FIU 109 has parallel connections to two time and control units (TCU) 0 and 0'. Digital signals representing the voice signals of the subscriber are transmitted to TCU 0 and TCU 0' for storage and switching. Each time and control unit has two stages associated with it, an originating time stage (OTS) and a terminating time stage (TTS). Subscriber A's voice signals are transmitted to the OTS of TCU 0 and TCU 0' for storage. The number of primary TCU's and back up TCU's indicated by the prime designation must be equal and within the range of from 1 to 64 units.

Next, parallel connections are simultaneously established from the OTS of TCU 0 to space switch 309 and from the OTS of TCU 0' to space switch 309'. Then, connections are established between the two space switching stages and the TTS of the TCU's. For example, a connection is made from space switch 309 to the TTS of TCU 63 and a parallel connection is made from space switch 309'. Voice signals from each TTS are switched to the appropriate FIU, in this example, FIU 209.

Then a connection is established from FIU 209 to subscriber B. However, a decision is made by FIU 209 to which set of voice signals to transmit to subscriber B. If no faults exist, the voice signals from the TTS of TCU 63 or TCU 63' will be transmitted to subscriber B. This decision is made on a predetermined set of conditions. If a fault exists in the switching path from the OTS of TCU 0 through space switch 309 to the TTS of TCU 63, then the voice samples from the TTS of TCU 63' are transmitted to subscriber B. If a fault exists in the path from TCU 0' through space switch 309' to TCU 63', then the voice signals from the TTS of TCU 63 are transmitted to subscriber B. A talking path now exists from subscriber A to subscriber B.

Next, a talking path is established from subscriber B to subscriber A. This path is established from subscriber B through FIU 209, through the OTS of TCU 63, through space switch 309, through the TTS of TCU 0, through FIU 109 to subscriber A and simultaneously a parallel connection is established from FIU 209 to the OTS of TCU 63', through space switch 309', through the TTS of TCU 0' to FIU 109. A decision is made in FIU 109, depending upon the fault condition of the network to determine whether the TTS of TCU 0 or the TTS of TCU 0' is to transmit to subscriber. This decision is similar to the decision made for the talking path from subscriber A to B. At this time, a complete talking path has been established between the two subscribers with the time-space-time network capable of sustaining a fault in one path in either direction.

Clock 409 is connected to each time stage of each TCU and to each space switching stage for proper synchronization between the primary and back up paths through the duplex network. For example, the OTS of TCU 0 is synchronized with the OTS of TCU 0'; space switch 309' is synchronized with the operation of space switch 30'; and TTS of TCU 63 is synchronized with the TTS of the TCU 63'; etc.

Figure 1A:
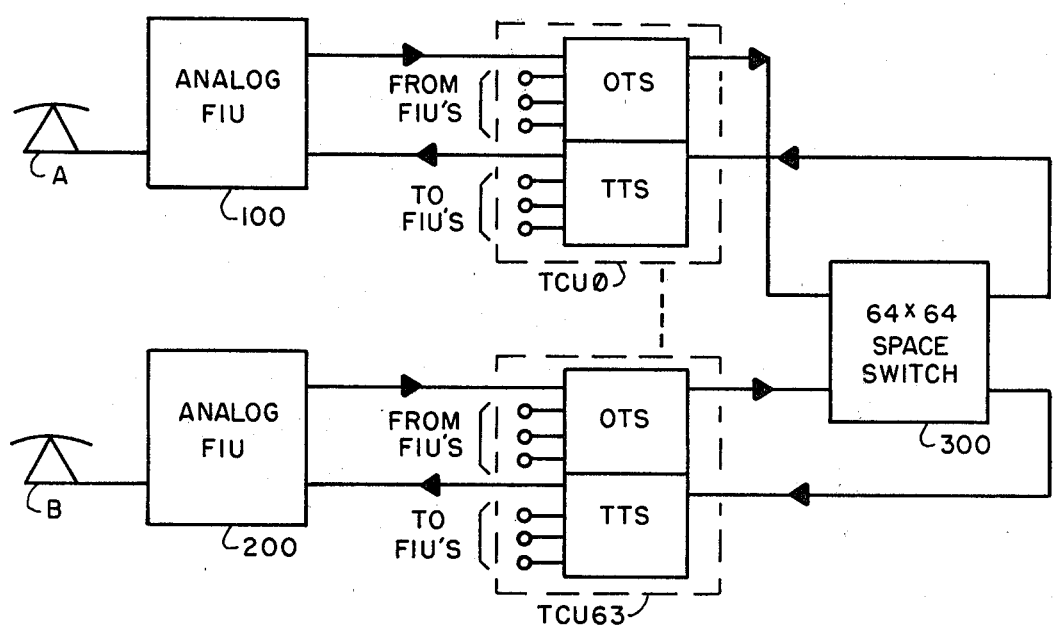
FIG. 1A is a block diagram depicting the simplex network structure showing the connections of the time and control units.

FIG. 1A is a block diagram showing the simplex network connections of a digital switching center for switching a local to local telephone call. Subsequent operations are described in terms of simplex operation to simplify description and understanding of the drawings, although it should be remembered that the operations described therein occur in parallel for each of the primary and back up network paths. Subscriber A is connected via an analog facility interface unit (FIU) 100. The analog FIU 100 has a PCM voice connection to time and control unit (TCU) 0. The digital switching network may contain from 1 to be 64 TCU's. Each TCU has 2 time stages associated with it, an originating time stage (OTS) and a terminating time stage (TTS). Each time stage (OTS or TTS) may be connected to up to four FIU's. Therefore, the number of TCU's and corresponding connected FIU's is modularly expandable.

Next, a connection is made from the OTS of the particular TCU to the 64 by 64 space switch 300. Then, a connection is established between the space switch 300 and the terminating time stage of a TCU 63, for example. The telephone subscriber B is then connected through analog FIU 200 to the TTS of TCU 63.

Next a voice transmission link is established from subscriber B to subscriber A. This communication link is established via analog FIU 200, through the originating time stage OTS of TCU 63, through space switch 300, through the terminating time stage TTS of TCU 0, through analog FIU 100 to subscriber A. At this time, a full talking path has been established from subscriber A to subscriber B.

Each of the analog FIU's converts the incoming analog voice signals to PCM signals for transmission through the network. The sampling rate of the FIU's is 8,000 samples per second or 1 every 125 microseconds. Each analog FIU has a capacity of 193 channels. Each time frame is 125 microseconds in duration and there are 193 time slots per time frame. One FIU time slot is 648 nanoseconds (ns.) in duration.

Figure 2:
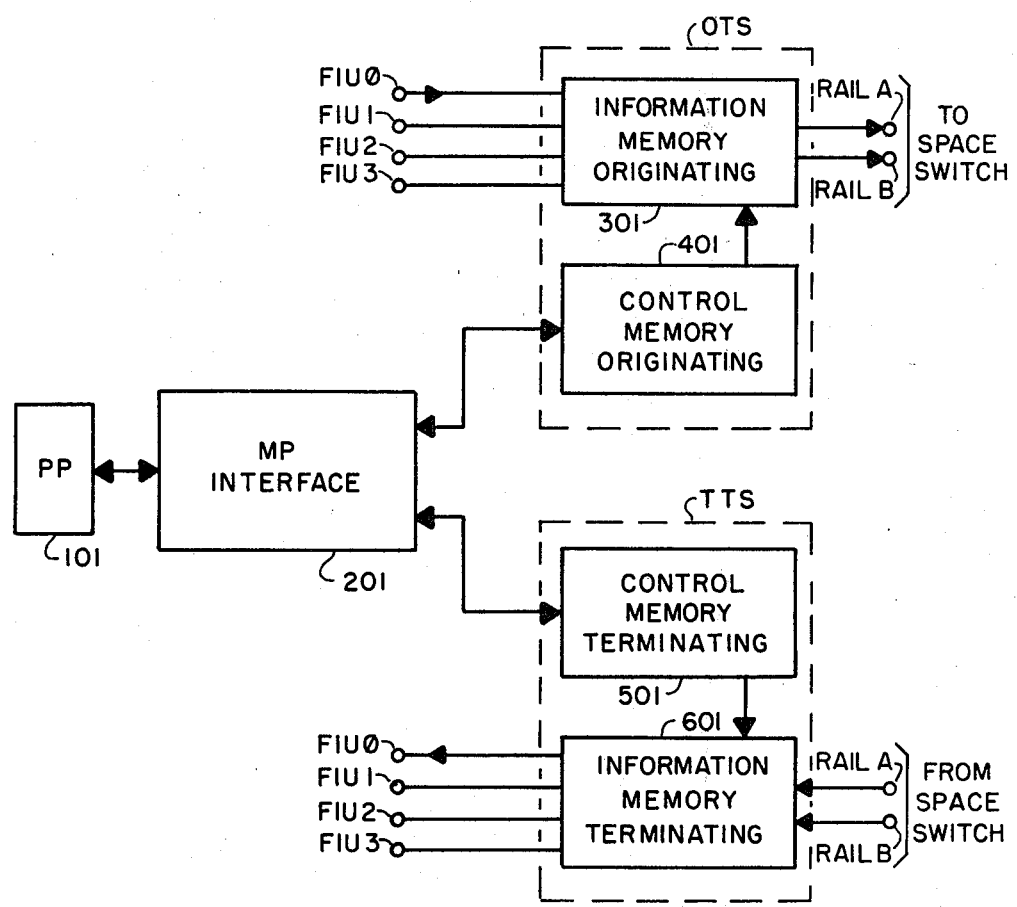
FIG. 2 is a block diagram showing the originating and terminating time switching stages of the network in simplex form.

FIG. 2 shows the connections of a particular TCU to a corresponding microprocessor CPU controller in simplex form. The CPU is a distributed peripheral processor (PP) 101. This processor may comprise an Intel 8086 microprocessor or other similar unit. Each stage of a time and control unit includes an information memory and a control memory. For example, the originating time stage OTS shown includes information memory 301 and control memory 401. Microprocessor interface 201 connects peripheral processor 101 to each of the control memories 401 and 501. These connections include an address and data bus and suitable controls for reading and writing the memory, along with clock signals. The information memories 301 and 601 each contain information memory units with PCM samples. Each TCU is connected to 4 FIU's. Each FIU provides for 193 channels of information to be transmitted through the information memory. Two groups of 193 channels comprise an information rail. Each information memory is therefore capable of handling 2 such rails. That is, each rail contains 386 channels of information.

Each information memory is further connected to the space switch (not shown in this figure). Each information memory contains PCM samples representing the amplitude of the voice signal. Twelve bits are required. Eight bits represent the amplitude of the voice signal, three bits of supervisory signals and one parity bit. Since each information memory contains 2 rails of incoming information and there is multiplexing within each rail, at least 2 physical memory units of 386 words are required.

Each control memory originating 401 and control memory terminating 501 contains data which is provided by the peripheral processor 101 and defines the input/output time slot relationship of its associated information memory originating 301 and terminating 601, respectively. Each channel originating from an FIU is assigned predetermined time slot address in the information memory originating 301 and the control memory originating 401. Time slots in each of the information memories 301 and 601 are automatically assigned, whereas time slots in control memories 401 and 501 are assigned by the stored program of the peripheral processor 101.

Each network time slot is allotted a basic time interval of 324 nanoseconds. This time slot interval is divided into two 162 nanosecond phases.

During the first phase, the control memory is read at the particular time slot counter address. During the same phase, the PCM data from each FIU is written into the information memory in the corresponding time slot.

During the second phase, the control memory is written into or read from by the peripheral processor 101 in order to control the operation of the time switch. During the same phase, the information memory is read at the address contained in the control memory data register corresponding to the particular time slot in question.

Figure 3:
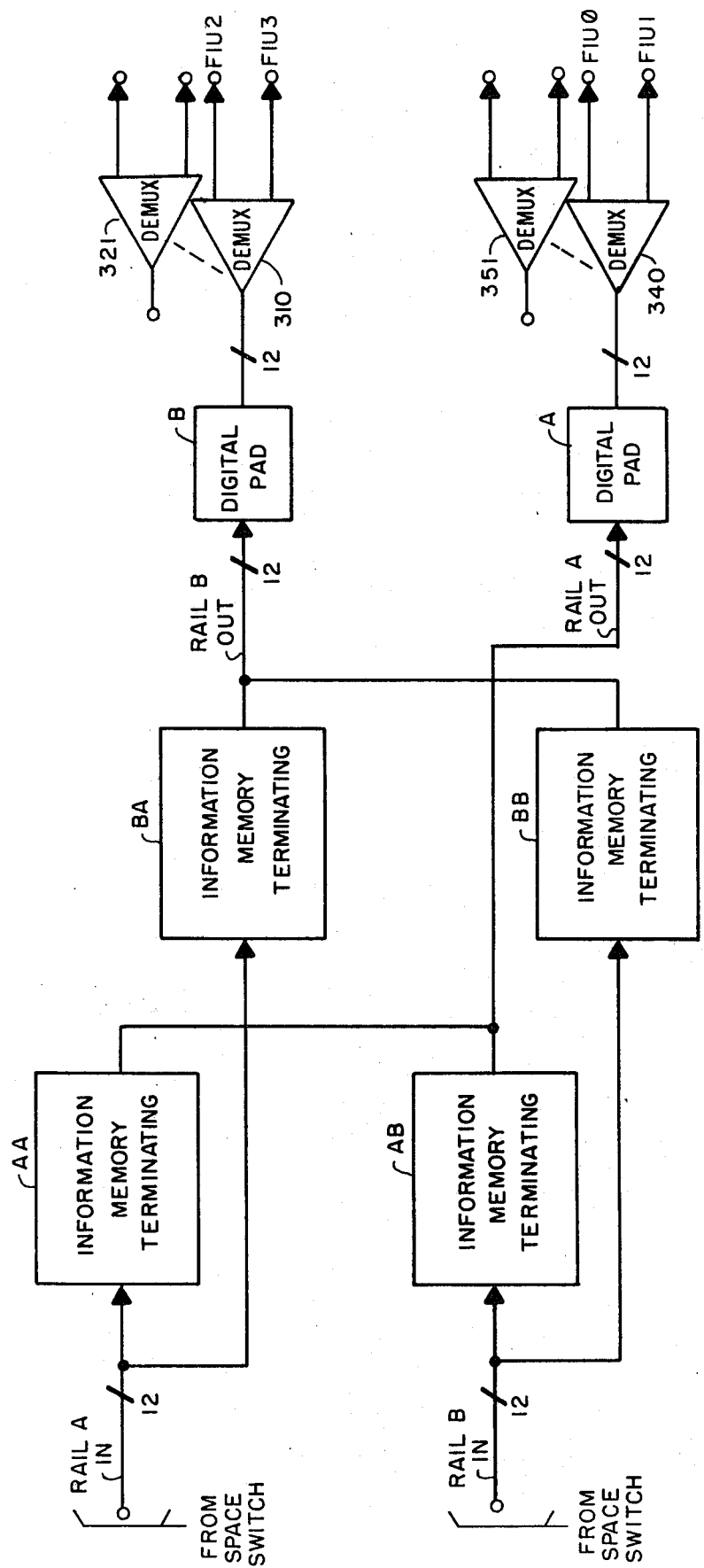
FIG. 3 is a schematic diagram showing the dual rail crossover of the terminating information memory in simplex form.

Referring now to FIG. 3, a schematic diagram of the information memory terminating as indicated by block 601 in FIG. 2 is shown. The information memory terminating comprises four information memory units AA, AB, BA and BB. Rail A in and rail B in buses connect the space switches to the information memories of the terminating time stage. Rail A in and rail B in buses each contain 386 channels of voice information.

The information memory unit identification consists of 2 letters. The first letter indicates the logical group of the memory and the second letter indicates the incoming rail from which the memory is written. Rail A is connected to information memory units AA and BA. Similarly rail B is connected to information memory units AB and BB.

The rail A out bus connects information memories AA and AB to FIU's 0 and 1 through digital pad A and demultiplexers 340-351. Similarly, the rail B out bus connects information memories BA and BB to FIU's 2 and 3 via digital pad B and demultiplexers 310-321. Digital pads A and B either permit the input signals to pass directly through or selectively attenuate the amplitude of these signals before distribution to the FIU's for reconversion to analog signals.

The voice samples transmitted on rail A are written into voice memories AA and BA and similarly the voice samples of rail B are written into information memories AB and BB. As a result, one memory unit in each logical group contains the voice information for each channel. Therefore, information entering the terminating time stage on rail A may exit the terminating time and control unit on rail B and vice versa.

This crossover of information from rail A to rail B and vice versa is a substantial factor in allowing the size of the space swith to be minimal. Crossover in the space switch would require four times the cross points as the present space switch. As a result, this crossover configuration in the terminating time stage provides for allocation of network paths equally through rail A and B and in addition, it prevents blocking conditions in the network.

Figure 4:
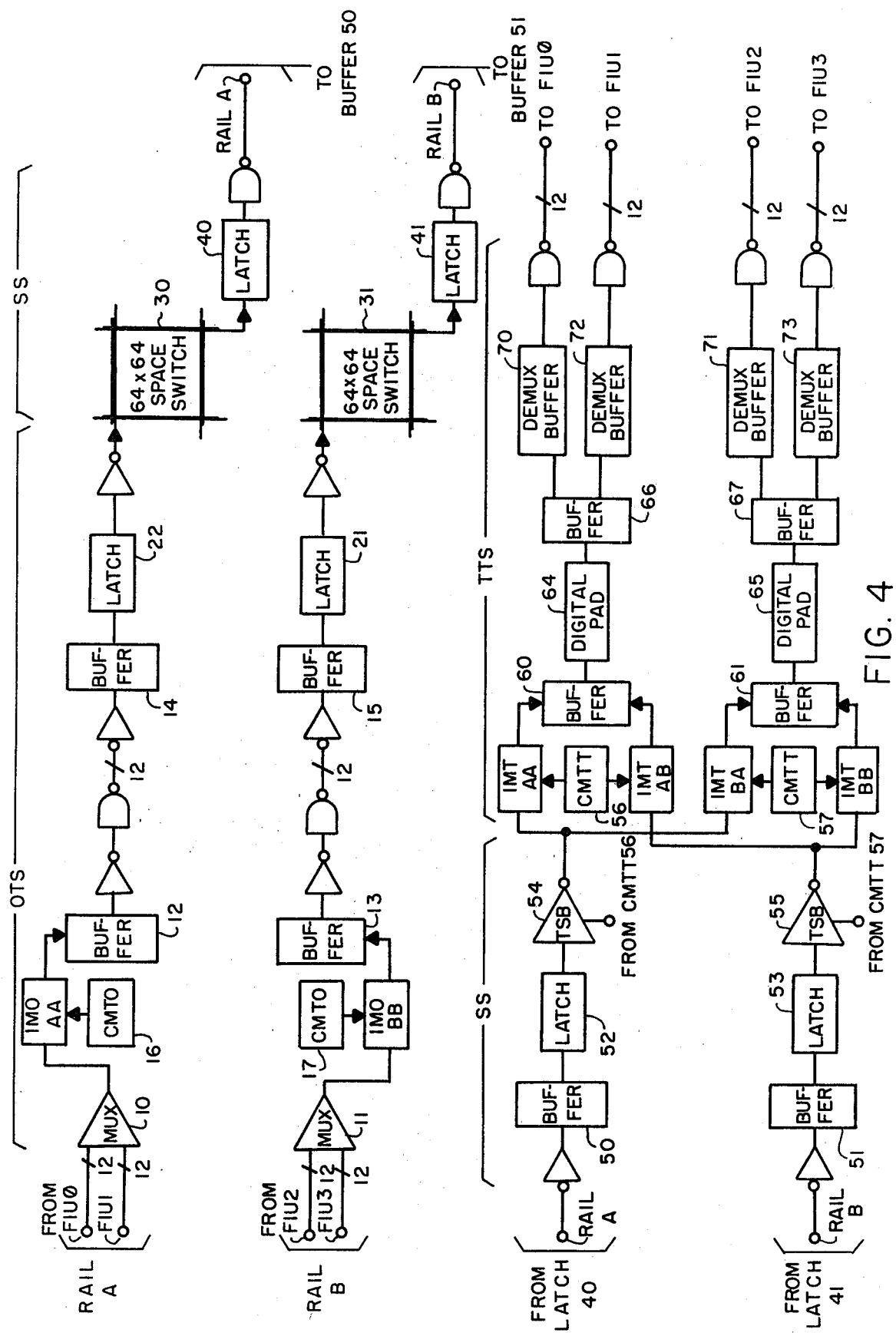
FIG. 4 is a schematic diagram of a simplex time-space-time switching network.

Referring now to FIG. 4, a schematic of the time-space-time network is shown in simplex form. The network is connected between facility interface units. These FIU's connect lines, trunks or other transmission media to the network for switching. Rail A, comprising PCM channel streams from FIU 0 and 1, is connected to 12 bit wide multiplex 10 to information memory originating IMO AA; and, similarly rail B is connected through 12 bit wide multiplex 11 to information memory originating IMO BB. Under control of a master processor (not shown), a connection through the space switch is established and the PCM voice samples gated out of the appropriate originating time slot memory and transmitted to the terminating time stage via the corresponding space stage (30 or 31). When PCM information is to be switched the 12 bit data word is transmitted through buffer 12 with appropriate drive and received by buffer 14 where the data is then latched in latch 22. When the space switching connection becomes stable data is transmitted through this connection to latch 40 where it is again provided with additional drive.

Rail B will transmit the data from FIU's 2 and 3 through buffers 13 and 15 to latch 21 where it would be switched through space switch 31 and held at latch 41, similar to the operation described above for rail A.

Again following the example of rail A, the 12 bit PCM sample is transferred from latch 40, through buffer 50 and is again latched by latch 52. At a time which is 8 times slots greater than the slot in which the PCM sample was stored in the originating time section, control memory terminating 56 operates tri-state buffer 54 to transmit the PCM data simultaneously into the information memory terminating IMT AA and IMT BA. Similarly, information on rail B is written simultaneously into information memory terminating IMT BB and IMT AB. The master processor determines which rail the PCM data should emerge from in the terminating time stage. For example, if rail A is selected by the master processor, then at the appropriate time slot in the terminating time stage, this information is read from information memory terminating IMT AA and transmitted through buffer 60 to the digital pad 64. The digital pad 64 will selectively attenuate the amplitude of the PCM signal. The data is then transmitted to buffer 66.

At the appropriate time division, either demultiplexing buffer 70 or 72 is operated depending upon which facility interface unit is to receive the voice sample. If FIU 0 is to receive the PCM sample, demultiplexing buffer 70 is operated and for FIU 1 demultiplexing buffer 72 is operated.

A similar operation would occur on rail B for a PCM signal switched through space switch 31, latch 41, buffer 51 into latch 53. At appropriate time slot, under control of the CMTT 57, tri-state buffer 55 is enabled and a PCM sample is stored in information memory terminating IMT BB and IMT AB. Peripheral processor 10 will establish proper switching information in control memory 57, and at the corresponding location in control memory 56. The information in control memory 57 will enable the PCM sample to be switched to FIU 2 or 3 through buffer 61, digital pad 65 and buffer 67 and either demultiplexing buffer 71 or 73. Although the PCM sample of a given time slot is written into rail A and rail B terminating time stage memory, the sample will be transmitted only from the one rail to which the called subscriber's FIU is connected.

The buffers (12, 13, 60, 61, 66 and 67) and latches (22, 21, 40, 41, 52 and 53) of FIG. 4 may be implemented with integrated circuit part number 74S175 or equivalent device such as manufactured by Texas Instruments Corporation. Buffers 14, 15, 50 and 51 may be implemented with integrated circuit part no. 74LS670. Multiplexer banks 10 and 11 may be implemented via integrated circuit part no. 74S157 or similar device. Information memories may be implemented via integrated circuit part no. 94L422 manufactured by Fairchild Semiconductor Inc.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a duplex time-space-time switching system including first and second parallel switching networks, said switching system transmitting a plurality of PCM voice samples over each of said first and second switching networks from a first to a second telephone subscriber via subscriber interface equipment, each of said subscribers being connected to each of said first and second parallel switching networks, said switching system comprising:

synchronization means;

each of said parallel switching networks including:

first and second buses connected to said subscriber interface equipment;

first and second space switching means connected to said synchronization means;

first and second originating time switching means connected respectively to said first and second space switching means, connected to said synchronization means and connected to said subscriber interface equipment via said first and second buses, each of said originating time switching means operating to switch said PCM voice samples from said subscriber interface equipment;

first and second terminating time switching means, said first and second terminating time switching means being connected respectively between said first and second space switching means, and said subscriber interface equipment and connected to said synchronization means, each of said terminating time switching means operating to switch said PCM voice samples from said first and second space switching means to said subscriber interface equipment;

each of said terminating time switching means including:

memory means connected between said first and second space switching and said subscriber interface, said first and second memory means being interconnected so that said first and said second memory means are written into simultaneously in sequential time slots with said PCM samples transmitted via said first and second space switching means;

gating means connected respectively between said first and second space switching means and each of said memory means of said first and second terminating time switching means, each of said gating means operating respectively in response to said memory means of said terminating time switching means to transmit said PCM samples from said first and second space switching means to said first and second memory means;

said first and said second memory means further operating so that said PCM samples from said first space switching means may be switched through said second terminating time switching means to said subscriber interface equipment or alternatively said PCM samples from said second space switching means may be switched through said first terminating time switching means to said subscriber interface equipment;

said switching system further including:

said synchronization means operating to simultaneously control said operation of said first and second originating time switching means of said first switching network synchronously with said first and second originating time switching means of said second switching network;

said first and second space switching means of said first switching network simultaneously operating with said first and second space switching means of said second switching network in response to said synchronization means and to said operation of each said first and second originating time switching means; and said first and second terminating time switching means of said first switching network simultaneously operating with said first and second terminating time switching of said second switching network in response to said synchronization means and to said operation of each said first and second space switching means.

2. A switching system as claimed in claim 1, wherein each of said first and second memory means of each said terminating time switching means of said first and second switching networks includes:

a control memory containing switching information;

an information memory connected to said corresponding control memory for storing said PCM samples;

said information memory of said first memory means being connected to said second gating means; and said information means of said second memory means being connected to said first gating means.

3. A switching system as claimed in claim 2, wherein in said memory means of each of said first and second switching networks:

each information memory includes at least first and second memory units;

said first memory unit of said first memory means is connected to said first memory unit of said second memory means and connected to said first gating means;

said second memory unit of said first memory means is connected to said second memory unit of said second memory means and connected to said second gating means;

said first and second memory units of said first memory means are connected to said subscriber interface equipment, said first memory unit operating to transmit said PCM samples to said subscriber interface equipment or alternatively said second memory unit operating to transmit said PCM samples to said subscriber interface equipment; and said first and second memory units of said second memory means are connected to said subscriber interface equipment, said first memory unit of said second memory operating to transmit said PCM samples to said subscriber interface equipment or alternatively said second memory unit of said second memory means operating to transmit said PCM samples to said subscriber interface equipment.

4. A switching system as claimed in claim 1, wherein each of said switching networks further includes:

selective attenuation means connected between each of said memory means of said terminating time switching means and said subscriber interface equipment, said attenuation means operating in response to said transmission of said PCM samples of said terminating time switching means to selectively decrease the amplitude of said PCM samples transmitted to said subscriber interface equipment in response to detection of a predetermined condition of said PCM samples.

5. A switching system as claimed in claim 4, wherein in each of said first and second switching networks:

said first bus includes:

a plurality of first bus means; and multiplexing means connected between each of said first bus means and said first and second originating time switching means; and said second bus includes:

a plurality of second bus means; and multiplexing means connected between each of said second bus means and said first and second originating time switching means.

6. A switching system as claimed in claim 5, wherein each of said first and second switching networks further includes:

first demultiplexing means connected between said selective attenuation means and said subscriber interface equipment; and second demultiplexing means connected between said selective attenuation means and said subscriber interface equipment;

each said demultiplexing means operated to time share said connection between said terminating time switching means and said subscriber interface equipment.

7. A switching system as claimed in claim 1, wherein:

each of said originating time switching means of each of said first and second switching networks includes:

a control memory containing switching information;

an information memory corresponding to and connected to said control memory for storing said PCM samples; and each of said information memories operating in response to said corresponding control memory to switch said PCM samples from each said information memory to said first and second space switching means respectively.

8. A switching system as claimed in claim 2 or 7, wherein there is included:

at least one central processing unit connected to each of said control memories for controlling time switching of said PCM voice samples.

9. A switching system as claimed in claim 1, wherein each of said first and said second switching networks further includes:

a plurality of said first and second originating time switching means; and a plurality of said first and second terminating time switching means connected respectively to said plurality of said first and second originating time switching means via said first and second space switching means of said first and second switching networks respectively, whereby the number of each of said originating and terminating time switching means of each said plurality is in the range of 2 to 64.

* * * * *